(12) United States Patent (10) Patent No.: US 6,296,079 B1
McNaughton (45) Date of Patent: Oct. 2, 2001

(54) SELF-SERVICE TERMINALS

(75) Inventor: Craig McNaughton, Kirkcaldy (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/551,374

(22) Filed: Apr. 18, 2000

(30) Foreign Application Priority Data

Apr. 24, 1999 (GB) .................................................. 9909405

(51) Int. Cl.[7] .............................. B61B 1/00; G06F 17/60; G06K 7/00; E05G 1/00
(52) U.S. Cl. ............................ 186/37; 235/379; 235/439; 109/45; 902/27
(58) Field of Search .................................. 186/37, 41, 53; 235/379, 380, 381, 383, 439; 902/25, 26, 27; 109/24.1, 45

(56) References Cited

U.S. PATENT DOCUMENTS

| 3,077,243 | * | 2/1963 | Buros | 186/37 |
| 4,735,289 | * | 4/1988 | Kenyon | 186/37 |
| 5,217,088 | * | 6/1993 | Dallman | 186/37 |

* cited by examiner

*Primary Examiner*—Robert P. Olszewski
*Assistant Examiner*—Bryan Jaketic
(74) *Attorney, Agent, or Firm*—Peter H. Priest

(57) ABSTRACT

Apparatus for improving the accessibility of a self-service terminal (SST) (50) comprises a sensor (52) for detecting the height of a user and a drive arrangement (84, 88) for moving a section of the terminal fascia incorporating a user-interfacing element such as a monitor (58) or keypad (62). The drive arrangement adjusts the position and orientation of the user-interfacing element to an optimum location relative to the detected height of the user.

14 Claims, 2 Drawing Sheets

SELF-SERVICE TERMINALS

BACKGROUND OF THE INVENTION

This invention relates to self-service terminals (SSTs), and in particular to methods and apparatus for automatically adjusting the position of user-interfacing elements of SSTs.

SSTs, such as automated teller machines (ATMs), are commonly and increasingly used to carry out many everyday transactions which do not require human supervision. In the case of ATMs, this is frequently the withdrawal of cash from a bank account.

To withdraw money from an account using a conventional ATM, the user is first required to insert a card into a card reader slot on the ATM fascia, the card serving as an identification token. The user must then confirm their identity, for example, by entering a personal identification number (PIN) associated with the card, but known only to the user. The PIN is entered on a keypad incorporated in the ATM.

The user will then proceed through a series of question and answer steps to obtain the desired service, typically in the format of reading instructions on a menu of choices displayed on a monitor incorporated in the ATM, and making selections by pressing keys arranged alongside the monitor.

Finally, the user may retrieve their cash from a dispensing slot provided in the ATM fascia, as well as a receipt, if desired, to provide a hard copy record of the transaction.

Clearly there is a requirement for ATMs, and other SSTs, to be of such a configuration as to be readily accessible to the user. To this end, ATMs are typically configured so as to be accessible by a user of average height, as determined by the Gaussian distribution of the height range of individuals. However, many individuals are not of average height, and those people who lie at the extreme ends of the Gaussian distribution, and hence diverge markedly from the average—for example, very tall individuals, very short individuals, or users in wheelchairs—may experience discomfort and difficulty in making use of a standard ATM, or may even be unable to use the machine at all.

In addition, there are a growing number of 'drive-up' SSTs, intended to allow users to make use of SSTs while seated in their vehicles. As motor vehicles are not of a uniform height or configuration, varying between sports cars and trucks and utility vehicles, access problems may be experienced by users of such drive-up SSTs.

SUMMARY OF THE INVENTION

It is among the objects of embodiments of the present invention to provide SSTs which are more easily accessible to users of different statures.

It is a further objective of embodiments of the present invention to provide drive-up SSTs which are more readily accessible to users seated in different vehicles.

According to one aspect of the invention, there is provided a method for improving the accessibility of a self-service terminal (SST) having at least one user-interfacing element, the method comprising the steps of: sensing the position of a user with respect to the SST; and adjusting the position or orientation of at least one user-interfacing element of the SST with reference to the sensed position of the user such that the element is more readily accessible to the user.

According to a further aspect of the invention there is provided apparatus for improving the accessibility of a self-service terminal (SST) including at least one user-interfacing element, the apparatus comprising a sensor for detecting the position of a user, and means for adjusting the position of a user-interfacing element of the SST with reference to the sensed position of the user to render the element more accessible to the user.

According to another aspect of the invention, there is provided a self-service terminal (SST) including a sensor for detecting the position of a user, at least one user-interfacing element for permitting the SST to interact with the user, and means for adjusting the position of the user-interfacing element with reference to the sensed position of the user such that the element is more readily accessible to the user.

These aspects of the present invention provide SSTs which are more easily accessible to a range of users, and facilitate provision of SSTs which are easily accessible to users of widely differing statures or users whose positioning relative to an SST differs markedly from the norm, for example a drive-up ATM user in a sports car or a high ground clearance 4×4 vehicle.

Preferably, the sensor comprises a camera mounted on or adjacent the SST. Conveniently, the sensor comprises an infra-red detecting camera; this enables the body heat of a user to be detected over the background, and the user's location determined by, for example, detecting the uppermost part of a user which is at or close to normal body temperature, and taking this location to be that of the user's head. Of course those of skill in the art will recognise that other forms of sensor may be employed to identify the location of the user relative to the SST, such as sensors which detect signals issuing from an emitter mounted on or adjacent the SST and reflected by the user.

Preferably, the means for adjusting the position of an element of the SST is capable of adjusting the position in one or more axes, and most preferably in a plurality of axes. For example, vertical translational movement may be used to bring a keypad to a convenient height for a user of the stature detected by the sensor, and rotational movement around a vertical axis may be used to orient a display screen so that it is more easily visible to a user who is detected at a position not directly in front of the SST, such as a user of a drive-up ATM that has stopped short of the ATM. If desired, translational and rotational movement may be provided in combination for a single element.

Preferably, the means for adjusting the position of an element of the SST comprises at least one drive motor, and most preferably a plurality of drive motors, to facilitate adjustment of the position of the element in a plurality of axes.

Preferably, the SST is provided with a plurality of user-interfacing elements, and two or more of said elements are adjustable.

Most preferably, a plurality of user-interfacing elements are adjustable independently. For example, if the SST is an ATM, independent adjustments may be made to the monitor, the keypad, and the card reader slot. Alternatively, a plurality of elements may be moved together, for example a section of fascia incorporating a plurality of user-interfacing elements may be adjustable.

Preferably, the adjustable element is mounted and positioned relative to the non-moving parts of the SST, and in particular adjacent areas of an SST fascia, such that the surfaces at the interface between the element and fascia remain in close proximity, that is, there are no gaps in the fascia of the SST whereby an unauthorized individual may gain access to the SST. Preferably also, a weather seal is provided at the interface, to prevent ingress of dust, moisture and the like to the interior of the SST. Conveniently, this is achieved by providing a resilient seal at the interface between the moving and non-moving elements of the SST.

Preferably, the adjusting means comprises at least one radial collar on which the adjustable element is mounted, the collar being located in a window in the fascia of the SST. Most preferably, the radial collar is in the form of a section of a curved surface, typically a cylinder or a sphere, depending on the desired degree of freedom of movement of the element. Such a radial collar provides a simple means whereby the orientation of an element may be adjusted.

Preferably, the apparatus further comprises a processing unit for determining the optimum position for each adjustable element of the SST based on the height or position of the user as determined by the sensor and instructs the adjusting means to adjust the element to an optimum position for the sensed height or position of the user. The optimum position for the element may be determined from a predefined list of possible positions or may be calculated for each user by means of appropriate algorithms; for example, having determined the location of the user's head relative to the sensor, the processing unit may determine the location of the user's head relative to each of the adjustable elements, and then instruct the adjustment of the orientation of each element so that the orientation of each element is optimal with respect to the user. Similarly, the position and orientation of elements such as keypads may be adjusted with respect to the sensed or estimated positions of a user's hands.

According to a still further aspect of the invention, there is provided a self-service terminal (SST) including a sensor unit for detecting the position of a user, at least one user interface element for permitting the SST to interact with the user, and at least one drive unit is for adjusting the position of said at least one user interface element with reference to the position of the user as detected by the sensor unit to render the element more readily accessible to the user.

In other aspects of the invention, information on the stature or positioning of a user may be obtained by means other than a sensor which locates the user, as described below.

According to a further aspect of the invention, there is provided a method for improving the accessibility of a self-service terminal (SST) having at least one user-interfacing element, the method comprising the step of: providing the SST with information relating to a user; and adjusting the position or orientation of at least one user-interfacing element of the SST with reference to said information such that the element is more readily accessible to the user.

According to another aspect of the invention there is provided apparatus for improving the accessibility of a self-service terminal (SST) including at least one user-interfacing element, the apparatus comprising means for receiving information relating to a user, and means for adjusting the position of a user-interfacing element of the SST with reference to received user information to render the element more accessible to a user.

According to another aspect of the invention, there is provided a self-service terminal (SST) including means for receiving information relating to a user, at least one user-interfacing element for permitting the SST to interact with the user, and means for adjusting the position of the user-interfacing element with reference to the received information relating to the user such that the element is more readily accessible to the user.

In accordance with these aspects of the invention, information on user stature and the like may be stored in a smart device, such as a smart card, smart button, or the like. The smart device is read by a smart device reader in the SST and the information is used to adjust one or more user-interfacing elements of the SST to suit the particular user. In other embodiments, once the user identity has been established by the SST, for example by means of one or more of a magnetic stripe card, PIN number or biometric identifier, user stature information may be retrieved from a remote database to allow the SST to be adjusted to suit the identified user. In addition or as an alternative to information on user stature, such user information may include other details of a user's particular physical traits, characteristics or requirements, for example that the user is a wheelchair user, the user is left-handed, the user has restricted use or mobility of one or both hands and, for drive-up SSTs, details of the user's motor vehicle.

These aspects of the invention may also be useful in applications where it is difficult to distinguish details of a user from the background, for example at an SST located in a busy shopping mall where people other than the user are likely to be in close proximity to the SST, or in SST locations where a user's stature or physical traits are likely to be disguised by heavy outdoor clothing.

BRIEF DESCRIPTION OF THE DRAWINGS

These and other aspects of the present invention will now be described by way of example only and with reference to the accompanying drawings, in which.

DETAILED DESCRIPTION

Figure 1:
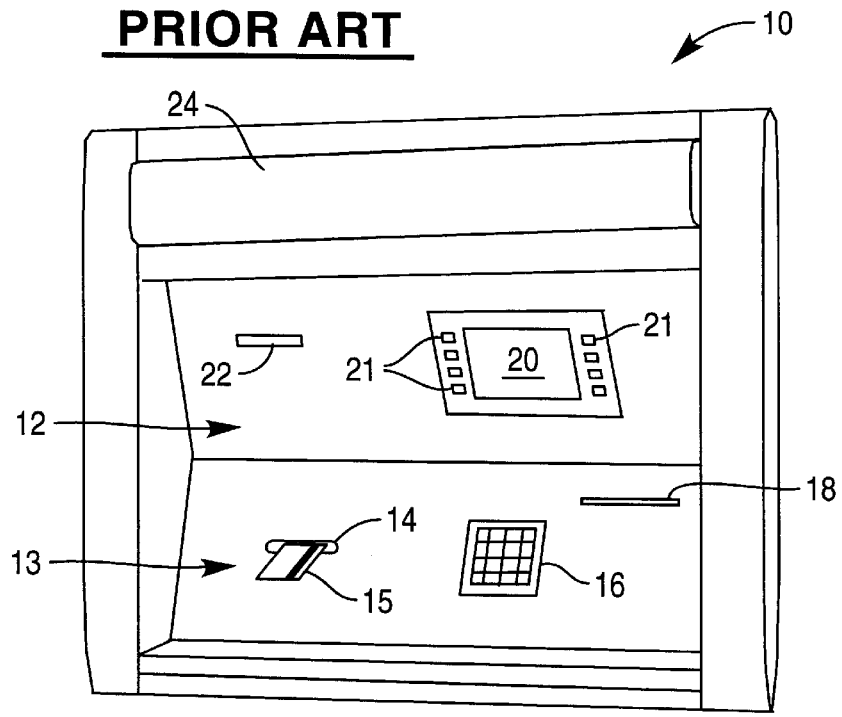
FIG. 1 shows a conventional prior art automated teller machine (ATM)

Referring first to FIG. 1, this shows the main elements of the fascia of a conventional ATM. The ATM 10 comprises two main fascia panels 12, 13. Mounted in the lower panel 13 is a magnetic card reader slot 14, where the user inserts an identification card 15; a keypad 16, where the user may enter their PIN or other data; and a cash dispensing slot 18, from where the user may collect bank notes. Mounted in the upper panel 12 are a monitor 20, which displays messages and instructions to the user, the monitor 20 being flanked by a series of keys 21, which the user may use to select options as displayed on the monitor 20; and a dispensing slot 22, used to dispense receipts and the like.

Above the two main panels 12, 13 is a further display panel 24, often used by the financial institution which operates the ATM to display its own name.

Figure 2:
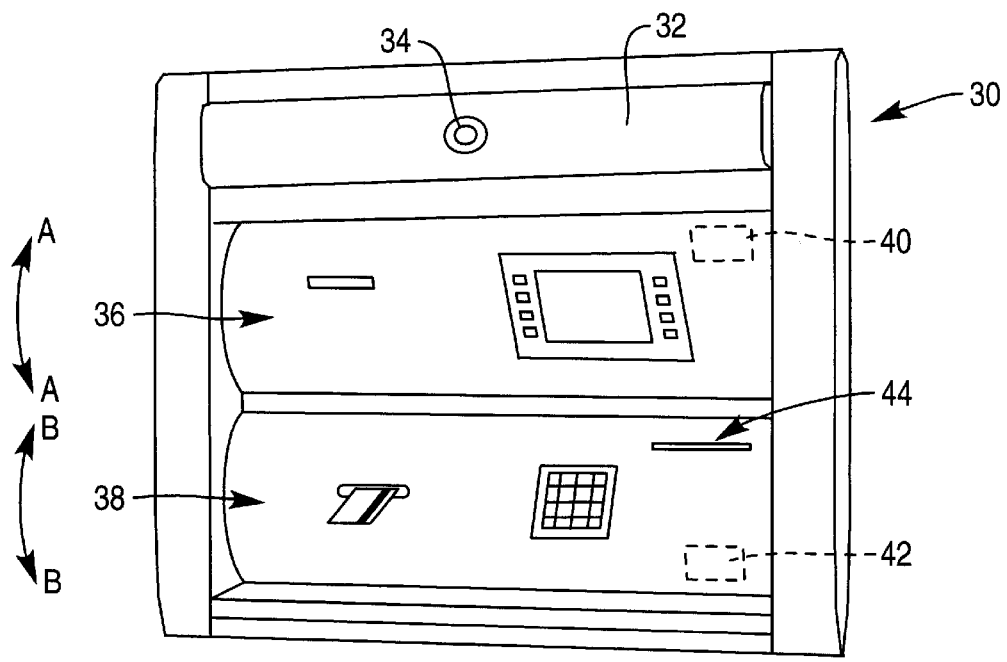
FIG. 2 shows an improved accessibility ATM incorporating a first embodiment of the present invention.

FIG. 2 shows an improved accessibility ATM 30 according to an embodiment of the present invention. Mounted in the upper display panel 32 is a sensor 34; in this example an infra-red detecting camera. The camera 34 is fitted with an appropriate lens, to provide the camera with a wide field of view and thus sense the position of users of a wide range of statures. The planar upper and lower panels 12, 13 of the conventional ATM of FIG. 1 have in this example been replaced with part-cylindrical panels 36, 38 pivotally mounted relative to the body of the ATM about respective horizontal axes. Each panel 36, 38 is coupled with a drive arrangement 40, 42 actuatable to pivot the respective panel 36, 38 in the directions shown by arrows AA and BB. Conveniently, the drive arrangements 40, 42 comprise electric motors driving respective gears which engage curved racks provided on the internal faces of the panels 36, 38. Resilient seals 44 are provided on the fascia around the panels 36, 38 to prevent dust and moisture from passing into the interior of the ATM.

In use, a user stands before the ATM, and is detected by the sensor 34 which determines the location of the user's head and thus the height of the user by identifying the uppermost area at body temperature in the sensor's field of view. A processor linked to the sensor 34 determines the orientation of the panels 36, 38 relative to the user's assumed eye level and hand positions, respectively, and instructs the drive arrangements 40, 42 to rotate the panels 36, 38 to bring the monitor and keypad into optimum positions for a user of the sensed height.

Figure 3:
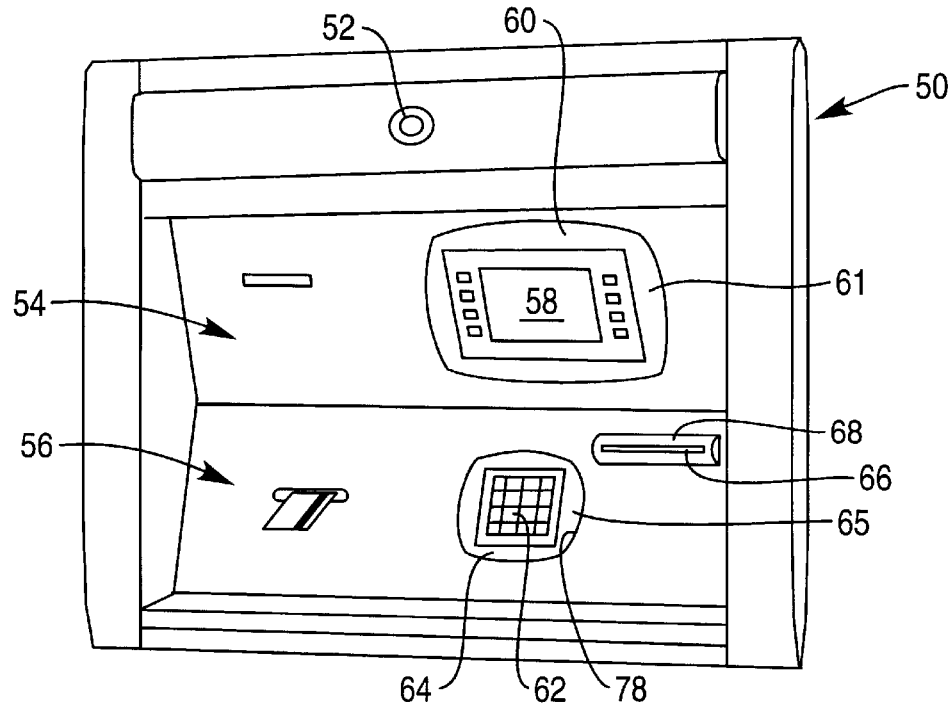
FIG. 3 shows an improved accessibility ATM incorporating a second embodiment of the present invention.
Figure 4:
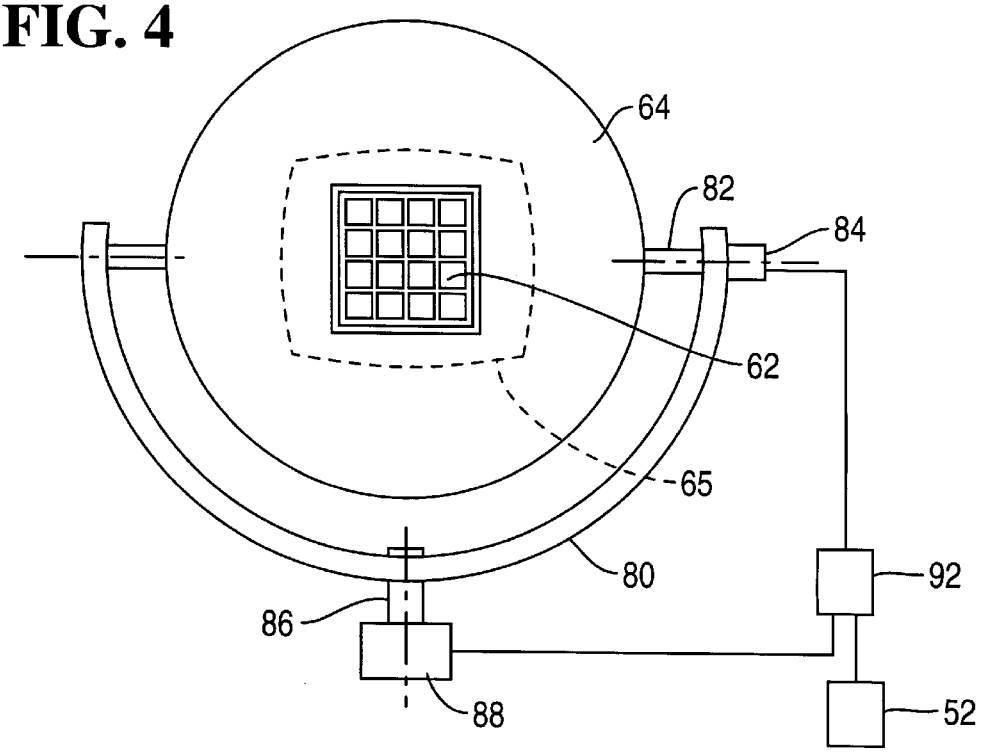
FIG. 4 shows a schematic detail of a portion of the ATM of FIG. 3.

FIG. 3 shows the fascia of an ATM 50 in accordance with an alternative embodiment of the present invention provided with a sensor 52 and upper and lower panels 54, 56. A monitor 58 is mounted in a part spherical radial collar 60, which is located behind a window 61 in the upper panel 54. Similarly, the keypad 62 is mounted on another part-spherical radial collar 64 located behind a window 65 in the lower panel 56. Drive arrangements, as will be described, lie behind each of the collars 60, 64, enabling the monitor 58 and keypad 62 to be moved both up\down and left\right, to an optimum position for a user of the stature as determined by the sensor 52 in combination with an appropriate sensor input processor 92 (FIG. 4). Additionally, a cash dispensing slot 66 is mounted on a cylinder 68 similar to the cylinders 32 and 34 described above.

FIG. 4 shows a schematic diagram of the spherical radial collar 64 of FIG. 3 (the collar dimensions are somewhat exaggerated in the Figure). Mounted centrally in the collar 64 is the ATM keypad 62. The area of the collar visible through the window 64 is surrounded by fascia-mounted rubber seals 78 (FIG. 3) to prevent moisture, dust and the like from passing into the interior of the ATM. The collar 64 is mounted on a semi-circular support 80, connected to the collar 64 by horizontal stub axles 82. One of the axles 82 is connected to a stepper motor 84 mounted on the support 80, which is operable to rotate the collar 64 on the axles 82. The support 80 is itself mounted on a vertical axle 86, connected to another stepper motor 88 mounted to the terminal chassis (not shown), which motor 88 is operable to rotate the support 80, and thus also the collar 64, on the axle 86. Both stepper motors 84, 88 are controlled by the user position sensor 52 and sensor input processor 92.

It will be understood that the foregoing is for illustrative purposes only, and that various modifications and improvements may be made to the apparatus described herein without departing from the scope of the invention.

What is claimed is:

1. A self-service terminal (SST) comprising:
   means for receiving previously stored information relating to a user and useful for adapting the self service terminal to the user;
   at least one user-interfacing element for permitting the SST to interact with the user; and
   means for adjusting the position of the user-interfacing element with reference to the received information relating to the user such that the element is more readily accessible to the user.

2. An automated teller machine (ATM) comprising:
   means for receiving previously stored information relating to an ATM customer and useful for adapting the ATM to the ATM customer;
   at least one customer-interfacing element for allowing the ATM customer to interact with the ATM; and
   means for adjusting the position of the customer-interfacing element based upon the received information relating to the ATM customer such that the element is more readily available to the ATM customer.

3. A self-service terminal (SST) comprising:
   a sensor for detecting the position of a user;
   a plurality of user-interfacing elements for permitting the SST to interact with the user; and
   means for adjusting the user-interfacing elements with reference to the sensed position of the user such that the elements are more readily accessible to the user.

4. A self-service terminal (SST) comprising:
   means for receiving information relating to a user including a smart device reader;
   at least one user-interfacing element for permitting the SST to interact with the user; and
   means for adjusting the position of the user-interfacing element with reference to the received information relating to the user such that the element is more readily accessible to the user.

5. An automated teller machine (ATM) comprising:
   a sensor for detecting the position of an ATM customer relative to the ATM;
   a plurality of customer-interfacing elements for allowing the ATM customer to interact with the ATM; and
   a mechanism for adjusting positions of the customer-interfacing elements based upon the sensed position of the ATM customer such that the elements are more readily accessible to the ATM customer.

6. An automated teller machine (ATM) comprising:
   means for receiving information relating to an ATM customer including a smart device reader;
   at least one customer-interfacing element for allowing the ATM customer to interact with the ATM; and
   means for adjusting the position of the customer-interfacing element based upon the received information relating to the ATM customer such that the element is more readily accessible to the ATM customer.

7. A self-service terminal (SST) comprising:
   a sensor for detecting the position of a user;
   a fascia;
   at least one user-interfacing element for permitting the SST to interact with the user, the user-interfacing element being mounted and positioned relative to non-moving parts of the fascia such that the surfaces at the interface between the user-interfacing element and the fascia remain in close proximity; and
   means for adjusting the user-interfacing element with reference to the sensed position of the user such that the element is more readily accessible to the user.

8. A self-service terminal (SST) comprising:
   a sensor for detecting the position of a user;
   at least one user-interfacing element for permitting the SST to interact with the user; and
   means for adjusting the user-interfacing element with reference to the sensed position of the user such that the element user-interfacing is more readily accessible to the user, the adjusting means comprising at least one radial collar on which the user-interfacing element is mounted, the collar being located in a window in a fascia of the SST.

9. An automated teller machine (ATM) comprising:

a sensor for detecting the position of an ATM customer relative to the ATM;

a fascia;

at least one customer-interfacing element for allowing the ATM customer to interact with the ATM, the user-interfacing element being mounted and positioned relative to non-moving parts of the fascia such that the surfaces at the interface between the user-interfacing element and the fascia remain in close proximity; and a mechanism for adjusting position of the customer-interfacing element based upon the sensed position of the ATM customer such that the customer-interfacing element is more readily accessible to the ATM customer.

10. An automated teller machine (ATM) comprising:

a sensor for detecting the position of an ATM customer relative to the ATM;

at least one customer-interfacing element for allowing the ATM customer to interact with the ATM; and a mechanism for adjusting position of the customer-interfacing element based upon the sensed position of the ATM customer such that the customer-interfacing element is more readily accessible to the ATM customer, the mechanism comprising at least one radial collar on which the user-interfacing element is mounted, the collar being located in a window in a fascia of the ATM.

11. A self-service terminal (SST) comprising:

a sensor for detecting the position of a user;

at least one user-interfacing element for permitting the SST to interact with the user; and means for adjusting the position of the user-interfacing element with reference to the sensed position of the user such that the element is more readily accessible to the user;

wherein the sensor includes an infra-red detector.

12. An automated teller machine (ATM) comprising:

a sensor for detecting the position of an ATM customer relative to the ATM;

at least one customer-interfacing element for allowing the ATM customer to interact with the ATM; and a mechanism for adjusting position of the customer-interfacing element based upon the sensed position of the ATM customer such that the element is more readily accessible to the ATM customer;

wherein the sensor includes an infra-red detector.

13. A method for improving accessibility of a self-service terminal (SST), the method comprising the steps of:

passively sensing the position of a user with respect to the SST; and adjusting the position or orientation of at least one user-interfacing element of the SST with reference to the sensed position of the user such that the element is more readily accessible to the user.

14. A self-service terminal (SST) comprising:

a passive sensor for detecting the position of a user;

at least one user-interfacing element for permitting the SST to interact with the user; and means for adjusting the position of the user-interfacing element with reference to the sensed position of the user such that the element is more readily accessible to the user.

* * * * *